(12) United States Patent
Al-Duwaish

(10) Patent No.: US 8,478,186 B2
(45) Date of Patent: Jul. 2, 2013

(54) EDUCATIONAL SYSTEM AND METHOD FOR TESTING MEMORIZATION

(75) Inventor: Hussain N. Al-Duwaish, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 681 days.

(21) Appl. No.: 12/662,877

(22) Filed: May 10, 2010

(65) Prior Publication Data

US 2011/0275048 A1    Nov. 10, 2011

(51) Int. Cl.
*G09B 7/00*    (2006.01)

(52) U.S. Cl.
USPC ............ 434/362; 434/350; 434/322; 434/236

(58) Field of Classification Search
USPC .................................. 434/322, 350, 362, 236
See application file for complete search history.

(56) References Cited

U.S. PATENT DOCUMENTS

| | | |
|---|---|---|
| 5,538,430 A | 7/1996 | Smith et al. |
| 5,820,379 A | 10/1998 | Hall et al. |
| 5,920,838 A | 7/1999 | Mostow et al. |
| 6,199,042 B1 | 3/2001 | Kurzweil |
| 6,324,511 B1 | 11/2001 | Kiraly et al. |
| 7,110,945 B2 | 9/2006 | Cogliano |
| 7,508,316 B1 | 3/2009 | Arrar |
| 2002/0013707 A1 | 1/2002 | Shaw et al. |
| 2004/0083092 A1 | 4/2004 | Valles |
| 2004/0199391 A1 | 10/2004 | Yoon et al. |
| 2004/0219494 A1* | 11/2004 | Boon ........................... 434/156 |
| 2005/0276570 A1 | 12/2005 | Reed et al. |
| 2005/0288930 A1 | 12/2005 | Shaw et al. |
| 2006/0105301 A1 | 5/2006 | Chriss |
| 2007/0055662 A1 | 3/2007 | Edelman et al. |
| 2007/0067054 A1* | 3/2007 | Danish ........................... 700/94 |

FOREIGN PATENT DOCUMENTS

| | | |
|---|---|---|
| DE | 102005024303 A1 | 11/2006 |
| GB | 2298514 A | 9/1996 |
| GB | 2414336 A | 11/2005 |
| KR | 20020071056 A | 9/2002 |
| WO | WO 01/01373 A2 | 1/2001 |

* cited by examiner

*Primary Examiner* — Kang Hu
(74) *Attorney, Agent, or Firm* — Richard C. Litman

(57) ABSTRACT

The educational system for testing memorization provides a computerized classroom system for testing a student's memorization of a text to be recited, for example, the text of the Qur'an. A set of digital data representing a text of a written work to be memorized by a student, such as the text of the Qur'an, is recorded in a database. Upon selection of a text portion to be tested, the portion is divided into individual words, and the user recites the portion, with the audio input being received and recorded by the system. The audio input from the user is converted into textual data, which is compared with a corresponding word of the portion stored in the database. If the spoken word matches the corresponding word portion stored in the database, the word is instantly displayed on a computer display, and the user may then speak the next word.

15 Claims, 7 Drawing Sheets

EDUCATIONAL SYSTEM AND METHOD FOR TESTING MEMORIZATION

BACKGROUND OF THE INVENTION

1. Field of the Invention

The present invention relates generally to computerized educational systems and methods, and particularly to an educational system and method for testing memorization that can be used to teach memorization of a text, such as the Qur'an.

2. Description of the Related Art

The Qur'an (which literally translates as "the recitation") is the central religious text of Islam (and is often transliterated as Quran, Qur'ān, Koran, Alcoran or Al-Qur'ān). The text of the Qur'an consists of 114 chapters of varying lengths, each known as a "sura". Chapters are classed as Meccan or Medinan, depending on where the verses were revealed. Chapter titles are derived from a name or quality discussed in the text, or from the first letters or words of the sura. Generally, longer chapters appear earlier in the Qur'an, while the shorter ones appear later. The chapter arrangement is thus not connected to the sequence of revelation.

Each sura is formed from several "ayat", or verses. The number of verses differ from chapter to chapter. An individual verse may be just a few letters or several lines. The actual number of ayat has been a controversial issue among Muslim scholars since Islam's inception, some recognizing 6,000, some 6,204, some 6,219, and some 6,236, although the words in all cases are the same. The most popular edition of the Qur'an, which is based on the Kufa school tradition, contains 6,236 ayat.

There is a crosscutting division into 30 parts, or "ajza", each containing two units called "ahzab", each of which is divided into four parts, or "rub 'al-ahzab". The Qur'an is also divided into seven stations, or "manazil". In addition to, and largely independent of, the division into suras, there are various ways of dividing the Qur'an into parts of approximately equal length for convenience in reading, recitation and memorization. The thirty ajza can be used to read through the entire Qur'an in a week or a month. Some of these parts are known by names, and these names are the first few words by which the "juz" starts. A juz' is sometimes further divided into two ahzab, and each hizb is subdivided into four rub 'al-ahzab. A different structure is provided by the "ruku'at", semantical units resembling paragraphs and forming roughly ten ayat each. Some also divide the Qur'an into seven manazil to facilitate complete recitation in a week.

The thirty ajza, or chapters, of the Qur'an include one hundred and fourteen separate suras, or episodes. Each episode has a differing length with a different number of ayat. Muslims memorize the Qur'an, or parts of it, so that they can recite it in their prayers. Typically, children, at a relatively early age, are encouraged to memorize the Qur'an or, at least, portions of it. This is typically taught in Mosques or in special schools under the supervision of instructors.

Some schools prepare their students such that they will memorize all of the Qur'an prior to graduation from primary school. In these schools, students typically recite the portions they have memorized in front of their instructors to make sure that their memorization is completely accurate. The process of testing the students, particularly in large schools with large numbers of students, is time consuming and detracts from the overall educational time. It would be desirable to provide a computerized process, allowing each student to be tested simultaneously and rapidly, thus leaving more time for teaching during the school day.

Thus, an educational system and method for testing memorization solving the aforementioned problems is desired.

SUMMARY OF THE INVENTION

The educational system for testing memorization provides a computerized classroom system for testing a student's memorization of a text to be recited, such as the text of the Qur'an. A set of digital data representing a text of a written work to be memorized by a student, such as the text of the Qur'an, is recorded in a database.

The student is presented with a selection of portions of the text to be tested. Upon selection of the portion to be tested, the portion is divided into individual words, and the user recites the portion word-by-word, with the audio input being received and recorded by the system.

The audio input from the user is converted into textual data representing the sequence of spoken words, and the textual data representing one word in the sequence of spoken words is compared with a corresponding word from the portion stored in the database. If the spoken word matches the corresponding word in the portion stored in the database, the word is instantly displayed to the user on a computer display, and the user may then speak the next word. If the spoken word does not match the corresponding word in the portion stored in the database, display of the word is delayed, indicating to the student that an error has been made. An error indicator is recorded, and the correct word is then displayed for the student. The user may then speak the next word.

The system includes a processor coupled with computer readable memory. A database is stored in the computer readable memory, the database including the set of digital data representing the text of the written work to be memorized by the student. A user interface is coupled to the processor. The user interface includes a microphone and a voice recognition module coupled with the processor. The voice recognition module has a speech-to-text sub-module associated for converting the audio input into textual data representing a sequence of spoken words.

A display is further coupled to the processor, and software is stored in the computer readable memory, the software being executable by the processor. The software includes instructions for the selection of at least a portion of the text of the set of digital data stored in the database for testing, with the portion being divided into individual words, along with the comparison of the textual data representing one of the sequence of spoken words with the corresponding word of the portion stored in the database, and the instant display of a visual representation of the spoken word on the display if the spoken word matches the corresponding word of the portion stored in the database. The instructions in the software also provide for the delay of the display of the visual representation of the spoken word on the display if the spoken word does not match the corresponding word of the portion stored in the database, and for further recording an error indicator in the computer readable memory corresponding to the word.

Preferably, the software recorded on the computer readable memory also allows for generation of a report, indicating if any errors occurred in the recitation, and providing accuracy-related information for review by the student, the student's instructor, or both. The report may be displayed to the user on the user's display, or may be transmitted to the instructor through a network interface. Preferably, a plurality of individual systems are provided, allowing each student in a classroom to be tested simultaneously, with the individual systems being interconnected in a network by a network interface associated with each system. The plurality of systems are further connected, via the network, with a central server, which may be the instructor's computer terminal, where the instructor may review the error reports for each student.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
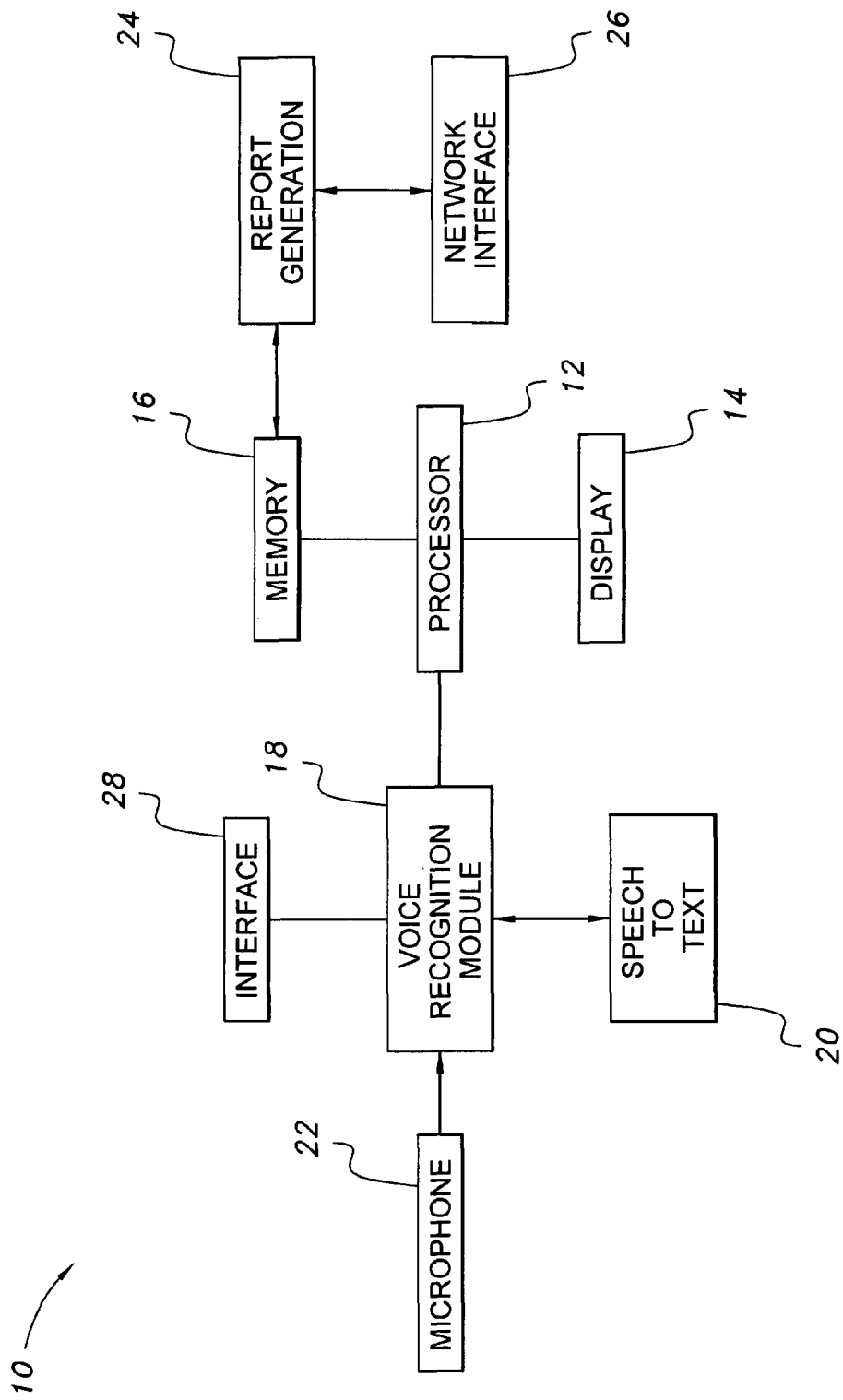
FIG. 1 is a block diagram of an educational system for testing memorization according to the present invention.

The educational system for testing memorization 10 provides a computerized classroom system for testing a student's memorization of a text to be recited, for example, the text of the Qur'an. A set of digital data representing a text of a written work to be memorized by a student, such as the text of the Qur'an, is recorded in a database. As shown in FIG. 1, the system 10 includes a processor 12 coupled with computer readable memory 16. The database is stored in the computer readable memory 16, with the database including the set of digital data representing the text of the written work to be memorized by the student, such as the text of the Qur'an.

It should be understood that system 10 may be any suitable computer system, such as that diagrammatically shown in FIG. 1. Data is entered into system 10 via any suitable type of user interface 28, and may be stored in memory 16, which may be any suitable type of computer readable and programmable memory. Calculations are performed by processor 12, which may be any suitable type of computer processor and may be displayed to the user on display 14, which may be any suitable type of computer display.

Processor 12 may be associated with, or incorporated into, any suitable type of computing device, for example, a personal computer or a programmable logic controller. The display 14, the processor 12, the memory 16 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 16, or in place of memory 16, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Display 14 may be any suitable type of computer display, such as a cathode ray tube (CRT) computer monitor, a liquid crystal display (LCD) computer monitor, or any other suitable type of visual display device.

Figure 3:
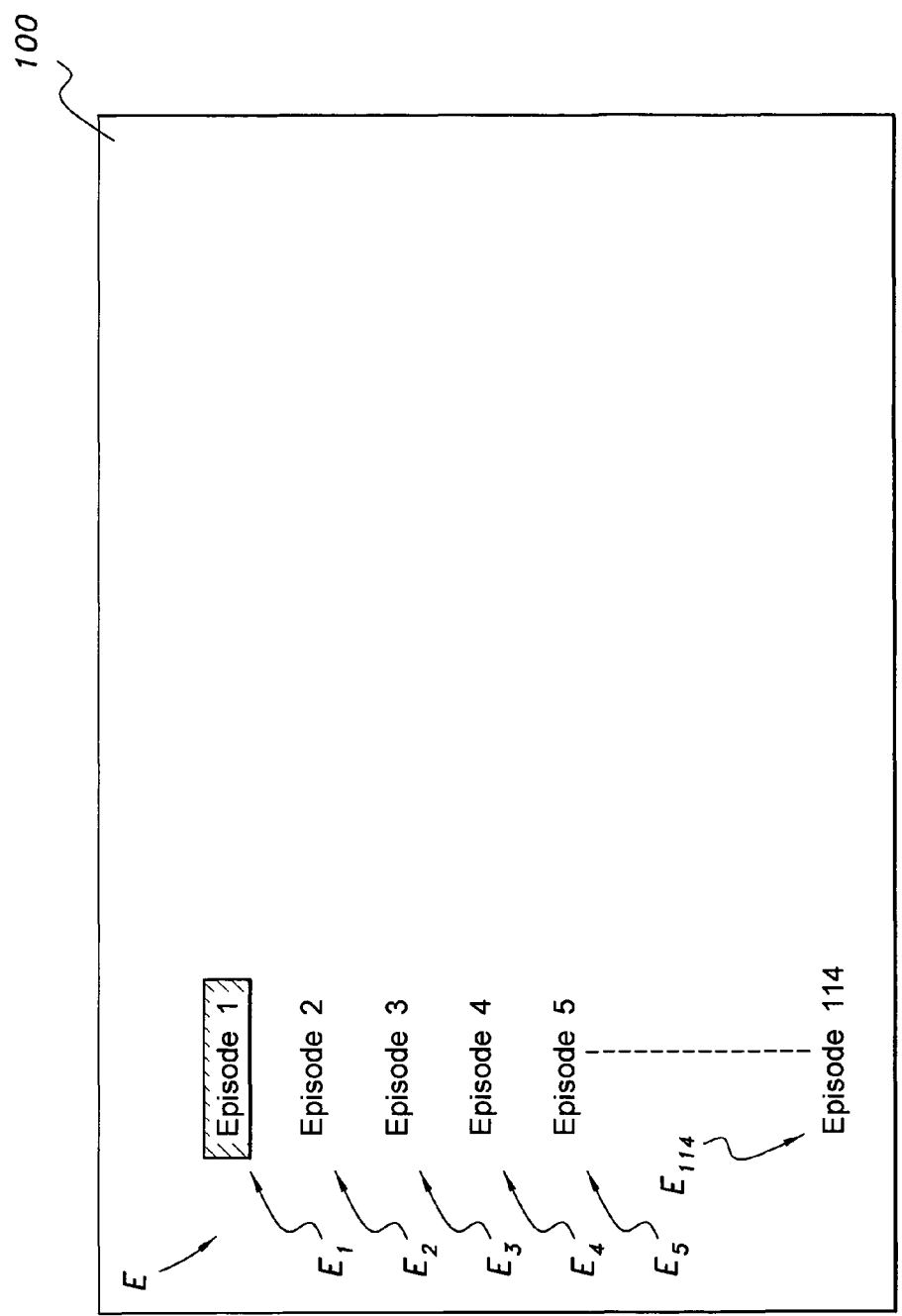
FIG. 3 is an exemplary screen shot of an initial display associated with the educational method for testing memorization according to the present invention.

FIG. 3 represents an initial screen shot of display screen 100 of display 14. In this initial presentation step, the student is presented with a selection of portions of the text to be tested. In the particular example of FIGS. 3 and 4, the Qur'an is the text that has been recorded in the database of memory 16. As noted above, the thirty ajza, or chapters, of the Qur'an include one hundred and fourteen separate suras, or episodes. Each episode has a differing length with a different number of ayat. Thus, the text of the Qur'an is stored in a data set of the database, and this data set is divided into a sub-set of data, representing the episodes E, and each episode E is further divided into subsets of ayat A.

In the initial display of FIG. 3, the student is present with a graphical display, listing, as an episode column E, each episode of the Qur'an $E_1$, $E_2$, $E_3$, $E_4$, $E_5$, . . . , $E_{114}$. In the particular example of FIG. 3, the user selects episode $E_1$ (indicated by a highlighted box with a cursor in FIG. 3).

Figure 4:
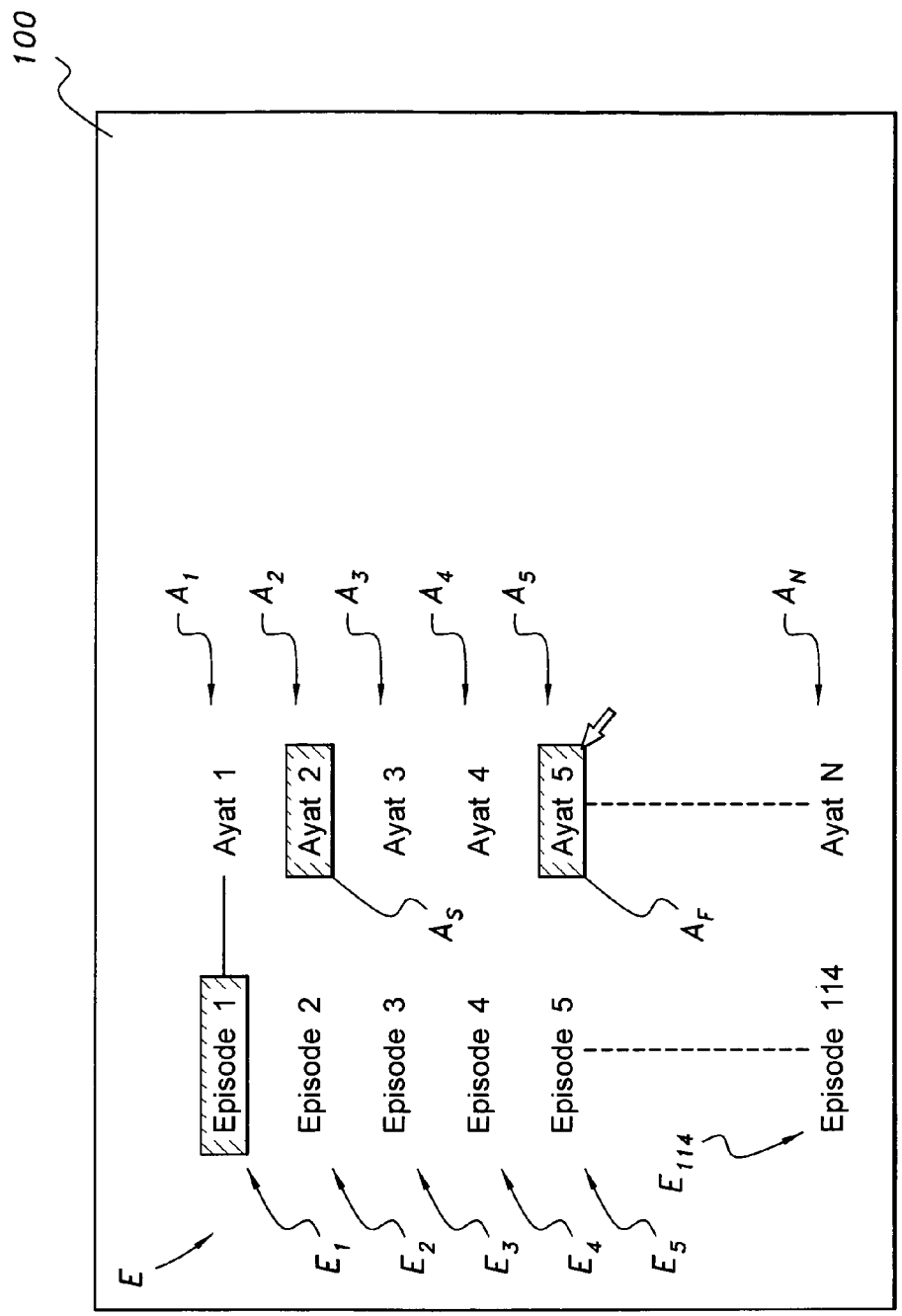
FIGS. 4, 5A, 5B, 5C, 5D, 5E and 5F illustrate exemplary display screens associated with the educational method for testing memorization according to the present invention.

In FIG. 4, the subset of ayat associated with $E_1$ is displayed, shown here as ranging from $A_1$, $A_2$, $A_3$, $A_4$, $A_5$ to $A_N$, as the number of ayat is not consistent for each sura. At this step, the user selects a range of the ayat to be tested. For example, the user may wish to begin recitation with the second ayat $A_2$ (indicated as a highlighted start box $A_S$), and finish recitation with the fifth ayat $A_5$ (indicated as a second highlighted finish box $A_F$).

Upon selection of the portion to be tested, the portion is divided into individual words, and the user recites the portion word-by-word, with the audio input being received and recorded by the system. Along with the conventional user interface 28, which may include a keyboard and/or a mouse or the like, which is coupled to the processor 12, a microphone 22 is provided for receiving the user's spoken words and converting the audio input into an electronic signal. The signal is received by a voice recognition module 18 coupled with the processor 12, and the voice recognition module preferably has a speech-to-text sub-module 20 associated therewith for converting the audio input signals into textual data representing a sequence of spoken words. Voice recognition software and hardware is well known in the art, and it should be understood that any suitable type of voice recognition and speech-to-text software may be stored in memory 16, or any suitable type of voice recognition may be utilized. Examples of such systems are shown in U.S. Pat. Nos. 5,920,838; 6,119, 042; and 7,110,945, each of which is hereby incorporated by reference in its entirety.

Figure 5B:
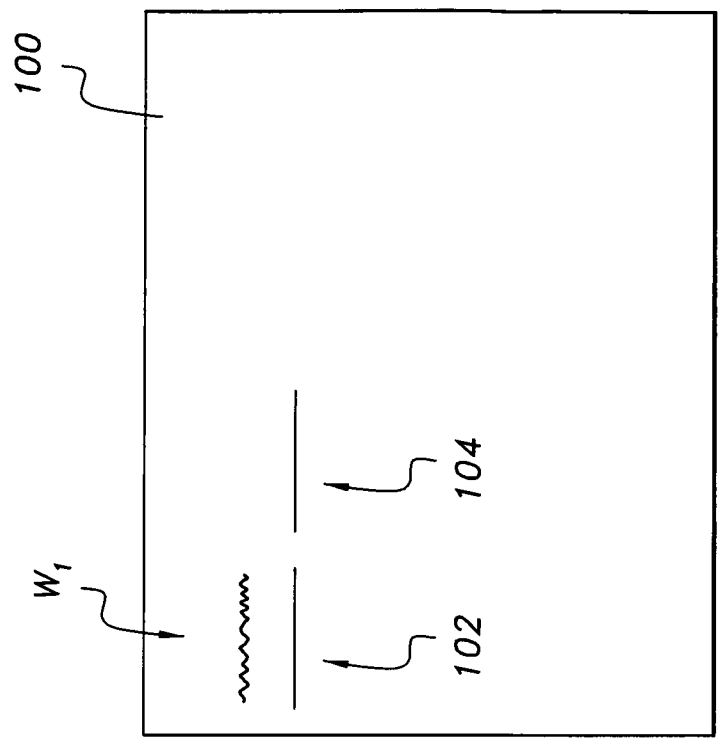
Figure 5A:
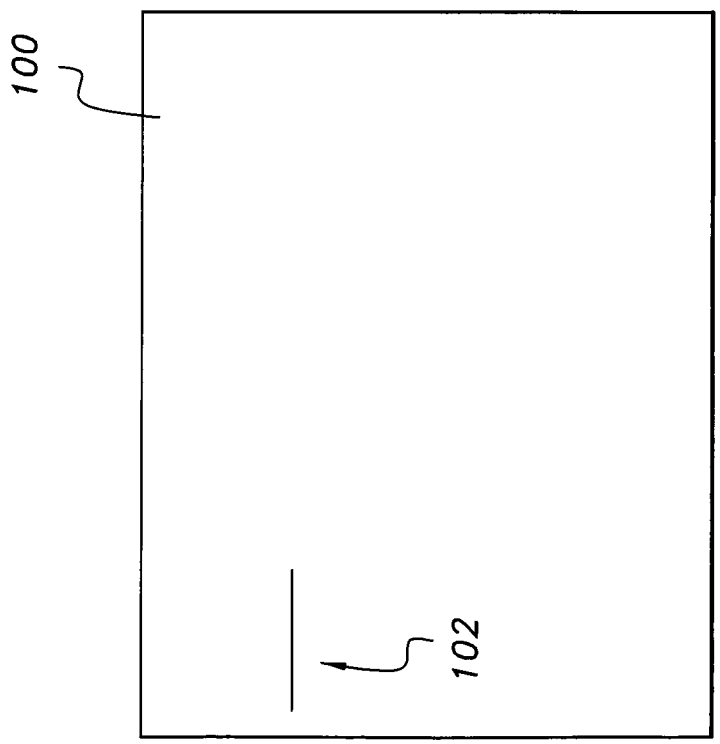
Figure 5C:
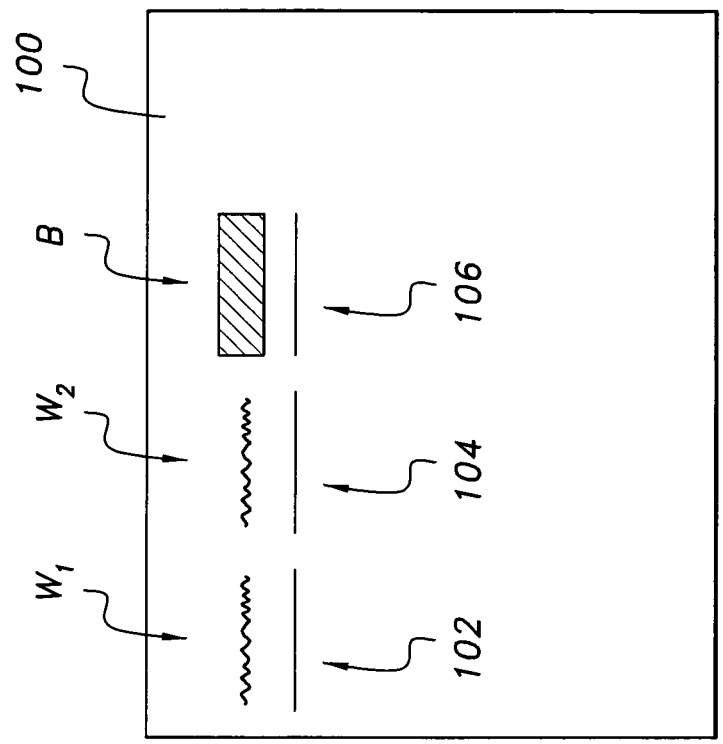
Figure 5D:
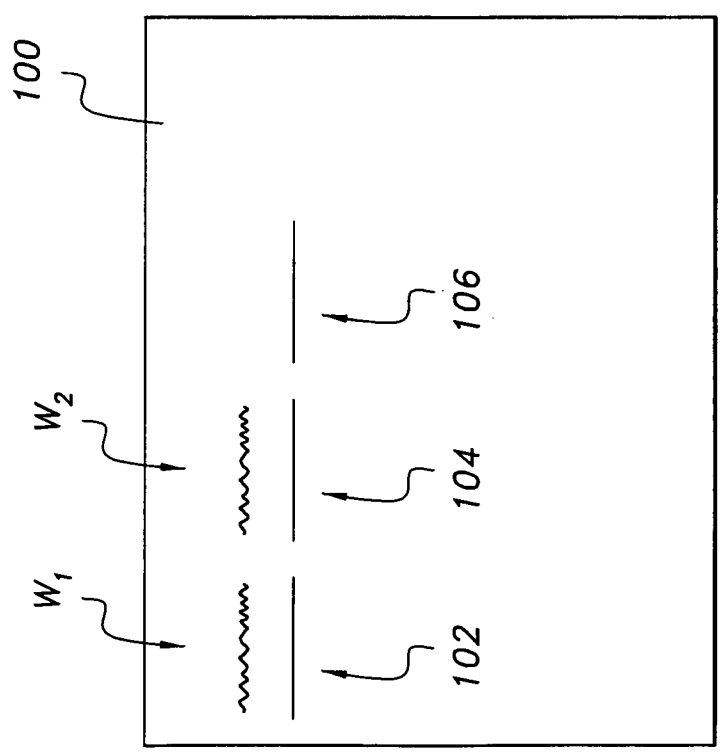

The audio input from the user is converted into textual data representing the sequence of spoken words, and the textual data representing one word in the sequence of spoken words is compared with a corresponding word in the portion stored in the database. FIG. 5A illustrates the testing screen, with 102 representing an initial space on the screen for the first word. If the spoken word matches the corresponding word portion stored in the database, the word is instantly displayed to the user on the computer display, and the user may then speak the next word. In FIG. 5A, the system is awaiting the user to speak the first word. Once the user has correctly spoken the first word, the first word $W_1$ is visually displayed (in space 102) for the user, as shown in FIG. 5B. At this point, the system is now waiting for the next word in the sequence, $W_2$, to be spoken (represented by the blank space 104). In FIG. 5C, the second word $W_2$ has been spoken correctly, and is displayed to the user in space 104. The system now waits to receive the next word in the sequence, $W_3$, with blank space 106 being the intended display location.

If the spoken word does not match the corresponding word portion stored in the database, display of the word is delayed, indicating to the student that an error has been made. In FIG.

Figure 5F:
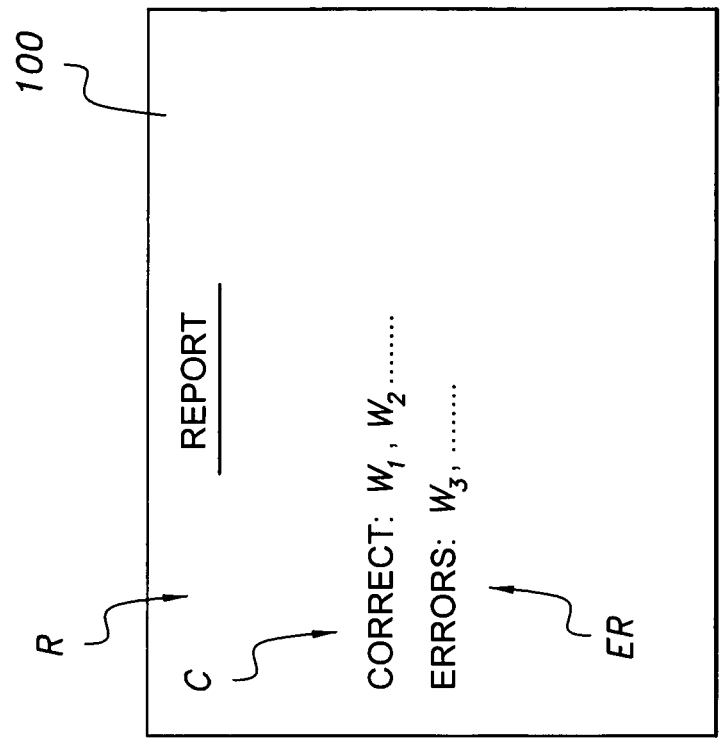
Figure 5E:
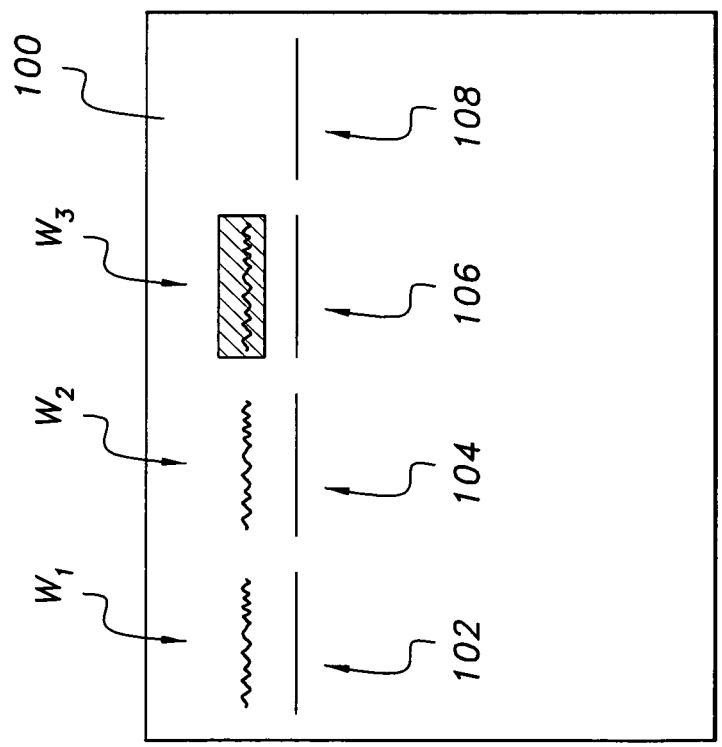

5D, the student has not spoken the next word in the sequence, $W_3$, correctly, and the highlighted box B in space 106 represents an error to the student. At this point, an error indicator is recorded in memory 16. Once the user has been alerted that an error has been made, either by the delay alone or by a separate error indicator, the correct word $W_3$ is displayed for the student in space 106 (as shown in FIG. 5E). The user may then speak the next word until reaching the end of the sequence.

Software is stored in the computer readable memory 16, the software being executable by the processor 12. The software includes instructions for the selection of at least a portion of the text of the set of digital data stored in the database for testing, the portion being divided into individual words, along with the comparison of the textual data representing one of the sequence of spoken words with the corresponding word of the portion stored in the database, and the instant display of a visual representation of the spoken word on the display 14 if the spoken word matches the corresponding word of the portion stored in the database. The instructions in the software also provide for the delay of the display of the visual representation of the spoken word on the display 14 if the spoken word does not match the corresponding word of the portion stored in the database, and for further recording an error indicator in the computer readable memory 16 corresponding to the word.

Preferably, the software recorded on the computer readable memory also allows for generation of a report, indicating if any errors occurred in the recitation, and providing accuracy-related information for review by the student, the student's instructor, or both. Generation of the report is preferably performed by a report generation module 24, recorded in the form of software instructions on memory 16. The report may be displayed to the user on the user's display, as illustrated in FIG. 5F, with report R including a listing C of words recited correctly, and a listing ER of errors in the recitation.

Figure 2:
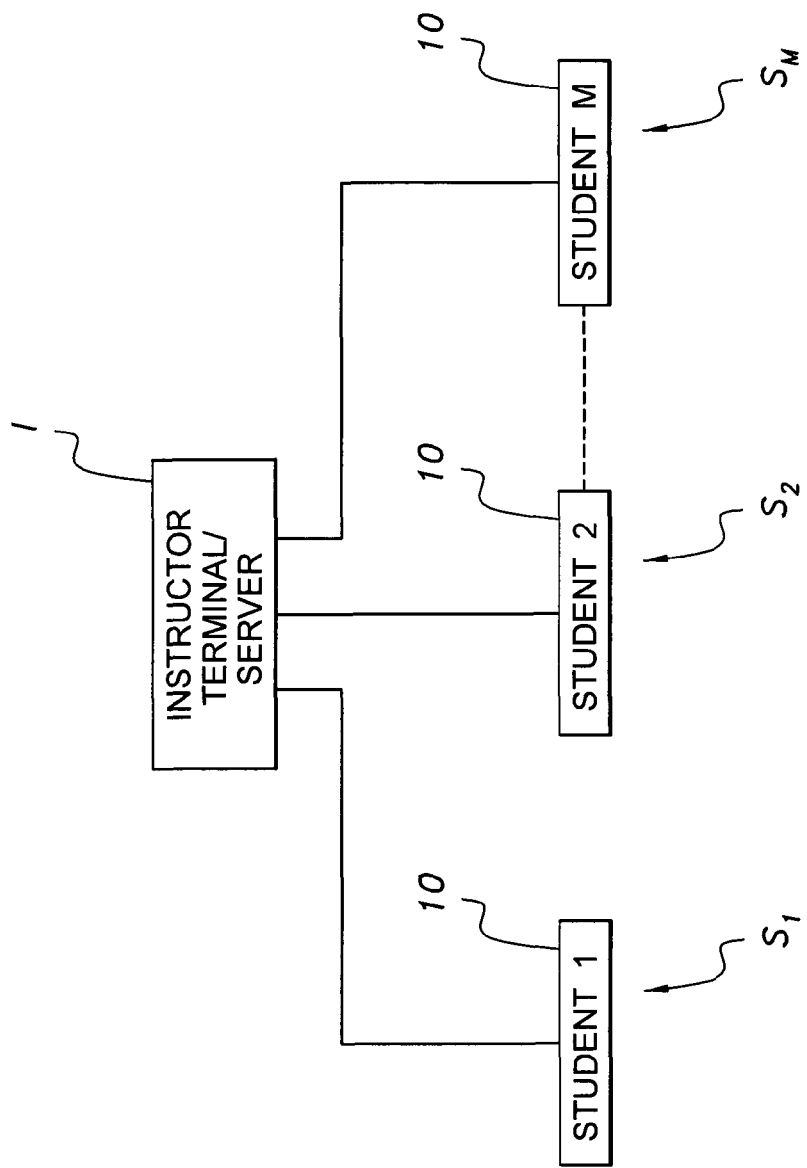
FIG. 2 is a block diagram illustrating multiple educational systems for testing memorization interconnected in a computer network.

Alternatively, the report may be transmitted to the instructor through a network interface 26. As shown in FIG. 2, preferably, a plurality of individual systems $S_1, S_2, \ldots S_M$ are provided, allowing each student in a classroom to be tested simultaneously, with the individual systems $S_1, S_2, \ldots S_M$ being interconnected in a network by a network interface 26 associated with each system. The plurality of systems $S_1, S_2, \ldots S_M$ are further connected, via the network, with a central instructor server I, which may be the instructor's computer terminal, where the instructor may review the error reports for each student. The network may be any suitable type of local area network (LAN) or wide area network (WAN), such as the Internet.

It is to be understood that the present invention is not limited to the embodiments described above, but encompasses any and all embodiments within the scope of the following claims.

I claim:

1. An educational system for testing memorization, comprising:
    a processor;
    computer readable memory connected to the processor, the computer readable memory having a database recorded therein, the database including a set of digital data representing a text of a written work to be memorized by a user;
    a user interface coupled to the processor, the user interface including means for receiving audio input from the user;
    means for converting the audio input into textual data representing a sequence of spoken words, the means for converting the audio input into text being coupled to the processor;
    a display coupled to the processor;
    software stored in the memory and executable by the processor, the software having:
        means for selecting at least a portion of the text of the set of digital data stored in the database for testing, the portion being divided into individual words;
        means for comparing the textual data representing one word in the sequence of spoken words with a corresponding word of the portion stored in the database;
        means for instantly displaying a visual representation of the spoken word on the display if the spoken word matches the corresponding word of the portion stored in the database; and
        means for delaying a display of the visual representation of the spoken word on the display if the spoken word does not match the corresponding word of the portion stored in the database, and further recording an error indicator in the computer readable memory corresponding to the word.

2. The educational system for testing memorization as recited in claim 1, further comprising means for generating a report indicating the error.

3. The educational system for testing memorization as recited in claim 2, further comprising a network interface coupled with said processor.

4. The educational system for testing memorization as recited in claim 3, further comprising means for transmitting the error report to a central server.

5. The educational system for testing memorization as recited in claim 4, wherein said network interface is adapted for interfacing a plurality of the educational systems for testing memorization with one another.

6. The educational system for testing memorization as recited in claim 5, wherein said network interface is adapted for interfacing the plurality of the educational systems for testing memorization with the central server.

7. The educational system for testing memorization as recited in claim 6, wherein the set of digital data stored in the database represents the text of the Qur'an.

8. An educational method for testing memorization, comprising the steps of:
    recording a database in computer readable memory, the database including a set of digital data representing a text of a written work to be memorized by a user;
    selecting at least a portion of the text of the set of digital data stored in the database for testing;
    dividing the portion into individual words;
    receiving audio input from the user;
    converting the audio input from the user into textual data representing a sequence of spoken words;
    comparing by a computer processor, the textual data representing one word in the sequence of spoken words with a corresponding word of the portion stored in the database;
    instantly displaying a visual representation of the spoken word if the spoken word matches the corresponding word of the portion stored in the database; and
    delaying a display of the visual representation of the spoken word if the spoken word does not match the corresponding word of the portion stored in the database, and further recording an error indicator in the computer readable memory corresponding to the word.

9. The educational method for testing memorization as recited in claim 8, further comprising the step of generating a report indicating the error.

10. The educational method for testing memorization as recited in claim 9, further comprising the step of transmitting the report to a central server.

11. The educational method for testing memorization as recited in claim 10, wherein said step of recording the database in the computer readable memory includes recordation of digital data representing a text of the Qur'an.

12. A computer software product that includes a non-transitory medium readable by a processor, the medium having stored thereon a set of instructions for testing memorization, the instructions comprising:
   (a) a first sequence of instructions which, when executed by the processor, causes the processor to record a database in computer readable memory, the database including a set of digital data representing a text of a written work to be memorized by a user;
   (b) a second sequence of instructions which, when executed by the processor, causes the processor to select at least a portion of the text of the set of digital data stored in the database for testing;
   (c) a third sequence of instructions which, when executed by the processor, causes the processor to divide the portion into individual words;
   (d) a fourth sequence of instructions which, when executed by the processor, causes the processor to receive audio input from the user;
   (e) a fifth sequence of instructions which, when executed by the processor, causes the processor to convert the audio input from the user into textual data representing a sequence of spoken words;
   (f) a sixth sequence of instructions which, when executed by the processor, causes the processor to compare the textual data representing one word in the sequence of spoken words with a corresponding word of the portion stored in the database;
   (g) a seventh sequence of instructions which, when executed by the processor, causes the processor to instantly display a visual representation of the spoken word if the spoken word matches the corresponding word of the portion stored in the database; and
   (h) an eighth sequence of instructions which, when executed by the processor, causes the processor to delay display of the visual representation of the spoken word if the spoken word does not match the corresponding word of the portion stored in the database, and further recording an error indicator in the computer readable memory corresponding to the word.

13. The computer software product as recited in claim 12, further comprising a ninth sequence of instructions which, when executed by the processor, causes the processor to generate a report indicating the error.

14. The computer software product as recited in claim 13, further comprising a tenth sequence of instructions which, when executed by the processor, causes the processor to transmit the report to a central server.

15. The computer software product as recited in claim 14, wherein the set of digital data stored in the database represents the text of the Qur'an.

\* \* \* \* \*